United States Patent
Ackermann et al.

(10) Patent No.: US 9,782,701 B2
(45) Date of Patent: Oct. 10, 2017

(54) CENTRIFUGAL-FORCE SEPARATOR AND FILTER ARRANGEMENT HAVING A CENTRIFUGAL-FORCE SEPARATOR OF SAID TYPE

(71) Applicant: MANN+HUMMEL GMBH, Ludwigsburg (DE)

(72) Inventors: Steffen Ackermann, Otterstadt (DE); Volker Greif, Harthausen (DE); Michael Kraxner, Landeck (AT); Ulrich Muschelknautz, Innsbruck (AT)

(73) Assignee: MANN+HUMMEL GMBH, Ludwigsburg (DE)

( * ) Notice: Subject to any disclaimer, the term of this patent is extended or adjusted under 35 U.S.C. 154(b) by 652 days.

(21) Appl. No.: 14/312,380

(22) Filed: Jun. 23, 2014

(65) Prior Publication Data
US 2014/0299540 A1    Oct. 9, 2014

Related U.S. Application Data

(63) Continuation of application No. PCT/EP2012/075117, filed on Dec. 11, 2012.

(30) Foreign Application Priority Data

Dec. 23, 2011  (DE) .................. 10 2011 122 322

(51) Int. Cl.
*B01D 21/26* (2006.01)
*B04C 3/06* (2006.01)
(Continued)

(52) U.S. Cl.
CPC ............. *B01D 21/26* (2013.01); *B04C 3/04* (2013.01); *B04C 3/06* (2013.01); *B04C 2003/006* (2013.01)

(58) Field of Classification Search
CPC ....... F02M 35/0223; F01N 3/037; B04C 3/04; B04C 3/06; B04C 2003/006; B01D 21/26;
(Continued)

(56) References Cited

U.S. PATENT DOCUMENTS 2,229,860 A * 1/1941 McCurdy ........... B01D 21/0012
                                                      210/304
3,517,821 A    6/1970 Monson
(Continued)

FOREIGN PATENT DOCUMENTS

| AT | 189173 B | 3/1957 |
| GB | 2169822 A | 7/1986 |
| GB | 2404603 A | 2/2005 |

*Primary Examiner* — David C Mellon
(74) *Attorney, Agent, or Firm* — James Hasselbeck (57) ABSTRACT

A centrifugal-force separator for separating particles from a fluid has a housing having an inflow opening and an outflow opening. An axial core and a plurality of guide blades connected to the axial core are provided, wherein the axial core and the guide blades are disposed in the housing. The guide blades generate a turbulent flow of a fluid flowing in through the inlet opening into the housing in an inflow direction. The guide blades extend radially between a first helical line at the axial core and a second helical line at a housing wall of the housing. A first pitch of the first helical line is greater than a second pitch of the second helical line.

22 Claims, 8 Drawing Sheets

(51) Int. Cl.
*B04C 3/04* (2006.01)
*B04C 3/00* (2006.01)

(58) Field of Classification Search
CPC ...... B01D 21/267; B01D 45/12; B01D 45/16; B01D 50/002
See application file for complete search history.

(56) References Cited

U.S. PATENT DOCUMENTS

| | | | | |
|---|---|---|---|---|
| 3,961,923 | A * | 6/1976 | Zia Rouhani | B01D 45/12 376/371 |
| 4,629,481 | A * | 12/1986 | Echols | B01D 45/16 122/34 |
| 5,466,272 | A * | 11/1995 | Karlsson | B01D 45/16 55/457 |
| 6,004,255 | A * | 12/1999 | Madsen | B04B 1/20 494/54 |
| 7,896,937 | B2 * | 3/2011 | Miemiec | B01D 45/16 55/337 |
| 8,343,360 | B2 * | 1/2013 | Schook | B04C 3/06 209/717 |
| 8,945,283 | B1 * | 2/2015 | Krishnamurthy | B04C 3/04 55/347 |
| 2009/0242481 | A1 * | 10/2009 | Barents | B04C 3/06 210/512.2 |
| 2010/0275561 | A1 * | 11/2010 | Lundquist | B04C 3/00 55/456 |
| 2012/0111196 | A1 * | 5/2012 | Schook | B01D 17/0217 95/271 |
| 2016/0186624 | A1 * | 6/2016 | Meusel | F01L 1/047 96/400 |

\* cited by examiner

CENTRIFUGAL-FORCE SEPARATOR AND FILTER ARRANGEMENT HAVING A CENTRIFUGAL-FORCE SEPARATOR OF SAID TYPE

CROSS-REFERENCE TO RELATED APPLICATIONS

This application is a continuation application of international application No. PCT/EP2012/075117 having an international filing date of 11 Dec. 2012 and designating the United States, the international application claiming a priority date of 23 Dec. 2011, based on prior filed German patent application No. 10 2011 122 322.7, the entire contents of the aforesaid international application and the aforesaid German patent application being incorporated herein by reference.

BACKGROUND OF THE INVENTION

The present invention relates to a centrifugal-force separator and a filter arrangement, for example, for filtering combustion air for an internal combustion engine.

Centrifugal-force separators, also referred to as cyclone filter, cyclone or cyclone separator, serve for separating solid or liquid particles contained in fluids. A fluid flowing into a centrifugal-force separator is guided such that centrifugal forces accelerate the particles to be separated from the fluid so that the particles can be collected within the separator. For generating the centrifugal forces, in most cases, guide blades are used that generate a turbulent flow within the separator housing.

Centrifugal-force separators can be used, for example, as air filters for combustion air of internal combustion engines. In particular in the case of dust-laden environments in which in particular agricultural or construction machinery is used, cyclone filters or centrifugal-force separators have been proven to be suitable.

In order to increase the degree of separation of dirt particles from air or fluid, multi-stage filter arrangements have also been proposed in the past. Downstream of a cyclone prefiltration, a further purifying filtering action using conventional filter media can be carried out, for example. However, this is associated with increased manufacturing expenditure and additional limitations with regard to the installation situation of a corresponding filter arrangement. Thus, it is desirable to improve the filtering capacity of centrifugal-force separators, in particular when used as an air filter for internal combustion engines.

SUMMARY OF THE INVENTION

It is therefore an object of the present invention to provide an improved centrifugal-force separator.

Accordingly, a centrifugal-force separator for separating particles from a fluid is proposed. The centrifugal-force separator comprises a housing which has an inflow opening and an outflow opening as well as a plurality of guide blades for generating a turbulent flow of fluid flowing in through the inlet opening. The guide blades extend in particular in certain sections radially between a first helical line at an axial core and a second helical line at a housing wall of the housing, and a pitch of the first helical line is greater than a pitch of the second helical line.

A helical line which can also be referred to as a helix, screw, spiral or coil is parameterized in particular by the pitch. Pitch is defined by the distance by which the helical line winds axially for a complete turn. This can also be referred to as a spacing in the Z-direction. By different pitches, a spreading of sorts of the guide blades is obtained which can lead to a beneficial separating degree of the centrifugal-force separator.

The pitch of the first helical line is, for example, at least 5%, in particular 10%, greater than the pitch of the second helical line. Preferably, the pitch of the first helical line is between 5% and 35%, in particular between 10% and 30%, greater than the pitch of the second helical line. Particularly preferred, the pitch of the first helical line is between 10% and 30%, in particular between 10% and 20%, greater than the pitch of the second helical line.

In embodiments of the centrifugal-force separator, the guide blades extend between an axial core and a housing wall of the housing, and an angle of attack of at least one guide blade from the core toward the housing wall.

It is also conceivable that the angle of attack of at least one guide blade changes along its length.

The respective guide blade has a leading side or leading edge and a trading side or trailing edge, on the other side, wherein the blade angle can be especially defined relative to a longitudinal axis of the centrifugal-force separator or of the housing. The blade angle at a location of the guide blade is the angle at which a tangential surface is positioned relative to the longitudinal axis of the guide apparatus or centrifugal-force separator. For example, at the leading side, i.e., in the direction toward the inflow opening of the centrifugal-force separator, the inflow angle is smaller than at the outflow side, i.e., in the direction toward the outflow opening. As a further angle parameter, an angle of attack can be determined also relative to a circumferential line or a cross-section perpendicular to the symmetry or longitudinal axis of the centrifugal-force separator. The sum of blade angle and angle of attack at a location of the guide blade is 90 degrees.

By a change of the angle of attack, the flow properties in the centrifugal-force separator can be improved.

Moreover, it is possible to provide an angular spread between the angle of attack at the core and the angle of attack at the housing wall. The angular spreading is preferably between 15° and 35°, in particular between 20° and 30°.

In embodiments, moreover an average angle of attack of the guide blades is between 30° and 45°.

It is possible that the pitches in the outflow section of the guide blades are identical. By eliminating the aforementioned spread in the outflow area, for example, by a predetermined height section of the guide apparatus, a good outflow can be achieved. In particular, the pitches in an outflow area that is less than 20% of the height of the entire guide apparatus are identical.

In embodiments, the leading edges and/or the trailing edges of the guide blades are located in a cross-sectional surface of the housing which is substantially perpendicular to an inflow direction of the fluid. The trailing edges can be, for example, cut off perpendicular to the longitudinal axis of the guide apparatus in a cross-sectional plane. Manufacture, for example, by injection molding, can thus be simplified.

In further embodiments of the centrifugal-force separator, the leading edges of at least two guide blades have a different spacing in relation to a cross-sectional area of the housing, which cross-sectional area is substantially perpendicular to an inflow direction of the fluid. The cross-sectional area can be considered as a reference plane at principally any position along the housing.

It can also be said that at least two guide blades have a different length in the flow direction of the fluid.

Centrifugal-force separators are to be understood in the following to include also cyclones, cyclone separators, cyclone filters or cyclone dust catchers. The proposed centrifugal-force separator is in particular configured as an axial cyclone, wherein the housing is tubular or sleeve-shaped, for example, and fluid to be filtered flows substantially along a longitudinal or symmetry axis of the housing through the separator. The particles to be separated are accelerated radially by the generated turbulent flow in the direction toward the outer housing wall and can be removed thereat.

Studies of the applicant have shown that in comparison to conventional guide blade arrangements, in which the guide blades have the same length, a centrifugal-force separator achieves better degrees of separation when the resulting guide apparatus is provided with blades of different lengths, or when the leading edges are differently positioned.

When flowing through the centrifugal-force separator, the inflowing fluid, such as particle-laden air, first impinges on the leading edge(s) of one or more first guide blades, and subsequently on the leading edge(s) of one or more further guide blades.

For example, one of the guide blades is shortened in the region of the inflow opening. This means that in the case of blades of different lengths, inflowing fluid flows a different distance along the guide blade, depending on the respective guide blade. As a result, the flow profile and the flow dynamic are positively influenced with regard to the degree of separation and pressure loss of the centrifugal-force separator. Overall, this results in a more efficient flow separator and beneficial flow conditions within the housing which result in the high degree of separation of particles.

For example, at the inflow side, at least two guide blades have a different spacing from the inflow opening in the flow direction of the fluid. The number of guide blades can be an even or odd number. In the case of a centrifugal-force separator provided with three guide blades, it is sufficient to make one guide blade shorter, for example, along the axis of the centrifugal-force separator, in order to achieve an improved degree of separation.

The core extends, for example, in collinear alignment with a longitudinal axis or symmetry axis of the housing. The housing, in particular in certain sections, can be sleeve-shaped or tubular. The axial core has then in general a predetermined diameter. A width of the resulting guide blades is then determined by the diameter of the core and also by the inner diameter of the housing.

In embodiments of the centrifugal-force separator having a sleeve-shaped or tubular housing, the guide blades and the axial core form a cylindrical guide blade apparatus that is inserted into the housing. Thus, the guide blade apparatus can preferably be fitted or inserted with guide blades of different lengths into different housings.

The guide blades are in general stationarily arranged. However, conceivable are also rotatable or movable guide blades in order to generate a turbulent flow or a swirled flow in an expedient manner.

A core diameter preferably ranges between 10 and 20 mm. Particularly preferred, a core diameter between 14 and 17 mm is realized. Based on the size of the core diameter, the flow properties within the housing of the centrifugal-force separator can be optimized.

In embodiments of the centrifugal-force separator, a thickness of at least one guide blade changes from the core toward the housing wall. The guide blades which can be wound, for example, in a propeller-, worm- or screw-like manner around the core, can be modeled with regard to their thickness. For example, the thickness of a respective guide blade between the core and the housing wall can first increase and can subsequently decrease again toward the housing wall. By means of a suitable thickness profile, swirl formation or flow properties of the fluid can be improved.

Alternatively or additionally, in further embodiments of the centrifugal-force separator, the thickness of at least one guide blade changes along its length. Length is substantially to be understood as the distance that a particle travels along the guide blade when it flows through the centrifugal-force separator or is carried by the fluid flow. The length of the guide blade is generally proportional to the height of the guide apparatus. Also, by varying the thicknesses of the guide blades along their length, the flow properties can be adjusted in a beneficial manner.

Embodiments of the centrifugal-force separator can furthermore provide that an inflow profile of at least one guide blade is wavy or curved. For example, the inflow profile which follows the shape of the leading edge can be non-linear. In particular, in the case of a guide apparatus with guide blades of different lengths, a different length of guide blades can be approximated by means of the inflow profile.

Preferred embodiments of centrifugal-force separators comprise exactly six guide blades. However, conceivable are fewer blades in order to generate a lower pressure loss when the fluid passes through the centrifugal-force separator. Studies of the applicant have shown that the more blades are used, the shorter the guide apparatus can be made for predetermined degrees of separation.

Furthermore, studies of the applicant have shown that a mean angle of attack between 40° and 50° relative to a cross-sectional area perpendicular to the longitudinal axis is particularly advantageous. Furthermore, a spread between the angle of attack at the core and the housing wall can range between 25° and 35°. For example, the blade angle of attack is approximately 60° at the core and 29° at the housing wall.

Preferably, the guide blades do not overlap on any cross-sectional area perpendicular to an inflow direction. In this manner, there is always at least a small gap between adjacent guide blades. This facilitates manufacturing, in particular when using an injection molding method, because no complicated undercuts are present. Thus, the resulting centrifugal-force separator can be produced in a particularly cost-effective manner. Suitable materials are in particular plastics, but in individual cases metal or other materials adapted to the installation situation and the operating temperature.

In embodiments of the centrifugal-force separator, the core is longer than the guide blades. For example, the core can protrude in the direction toward the inflow opening of the housing or can also form a trailing hub in the direction toward to the outflow opening. The preferably rotationally symmetric core, for example, can taper in the direction of the fluid flow and can influence the flow properties. For example, a ratio between the core diameter and a spacing between the housing wall and the core is between 2 and 4. The spacing between the core and the housing wall can also be referred to as width of the guide blades.

In further embodiments, the cross-sectional area of the housing changes along the flow direction. For example, the cross-sectional area increases along the longitudinal axis from the inflow opening toward the outflow opening. This can result in a conical shape of the housing. Also, the housing can be conical in certain sections. For example, the guide apparatus is arranged in a sleeve-shaped or cylindrical region of the housing, and the outflow region in which the fluid is subjected to the turbulent flows has a conically widening shape in the direction toward the outflow opening. An opening angle of the cone preferably ranges between 2° and 6°.

Optionally, the centrifugal-force separator can comprise an immersion tube which is provided in the housing and extends from the outlet opening in the direction toward the inflow opening. The immersion tube can be formed in a tubular or sleeve-shaped manner. Preferably, the immersion tube is provided with a cross-section that tapers toward the inflow opening.

In particular a combination of an immersion tube that tapers conically in the direction toward the inflow opening and of a conically shaped housing section in the region of the immersion tube or the outflow opening results in particularly beneficial flow conditions and degrees of separation of the centrifugal-force separator.

In preferred embodiments of the centrifugal-force separator, the immersion tube is secured at the outflow opening by means of an immersion tube plate. For example, the immersion tube plate together with the immersion tube closes off the outflow opening of the housing. In this case, the immersion tube plate is implemented, for example, as a circular ring with an outer diameter that corresponds to the outflow opening, and with an inner diameter that corresponds to an edge of the immersion tube.

Furthermore, in some embodiments, the centrifugal-force separator is provided with a particle discharge opening. The particle discharge opening preferably opens a predetermined angular section in the housing wall relative to a longitudinal axis of the housing. Furthermore, the particle discharge opening has a discharge opening or discharge window depth. The depth is measured, for example, along the longitudinal axis of the housing.

Preferred embodiments of the particle discharge window have a depth between 10 and 20 mm, and particularly preferred between 13 and 15 mm. The opening angle of the particle discharge window preferably ranges between 60° and 90°. Particularly preferred, the opening angle ranges between 75° and 85°.

Furthermore, a filter device is proposed. The filter device comprises a plurality of centrifugal-force separators with one or more features as described above. The centrifugal-force separators are provided in a housing of the filter device, which housing comprises a plurality of openings as inflow openings for the centrifugal-force separators, and comprises an outflow section that is separated from the openings in a fluid-tight manner. The outflow openings of the centrifugal-force separators are coupled to the outflow section. Thus, a plurality of centrifugal-force separators can be arranged in parallel for cleaning, for example, combustion air for internal combustion engines. By means of the parallel arrangement of the centrifugal-force separators, the degree of separation and the pressure loss for fluid passing through the filter device can be adjusted.

In embodiments of the filter device, a discharge section is provided that is separated in a fluid-tight manner from the inflow openings and the outflow section. The discharge section is communicatively connected to the particle discharge windows of the centrifugal-force separators. Thus, a region is provided that is sealed in a fluid-tight and dust-tight manner and that serves for discharging the separated particles.

Further possible implementations of the invention comprise also combinations, which are not explicitly mentioned, of features or embodiments of the centrifugal-force separator or the filter device that have been described above or in the following with regard to the exemplary embodiments. The person skilled in the art will also add or modify individual aspects as improvements or supplements to the respective basic form of the invention.

Further configurations of the invention are subject matter of the dependent claims and the exemplary embodiments of the invention described hereinafter. In the following, the invention is explained in more detail by means of exemplary embodiments with reference to the attached figures.

BRIEF DESCRIPTION OF THE DRAWINGS

In the Figures, same reference numbers designate same or functionally identical elements unless otherwise stated.

DESCRIPTION OF PREFERRED EMBODIMENTS

Figures 1, 2, 3, 4, 5, 6, 7:
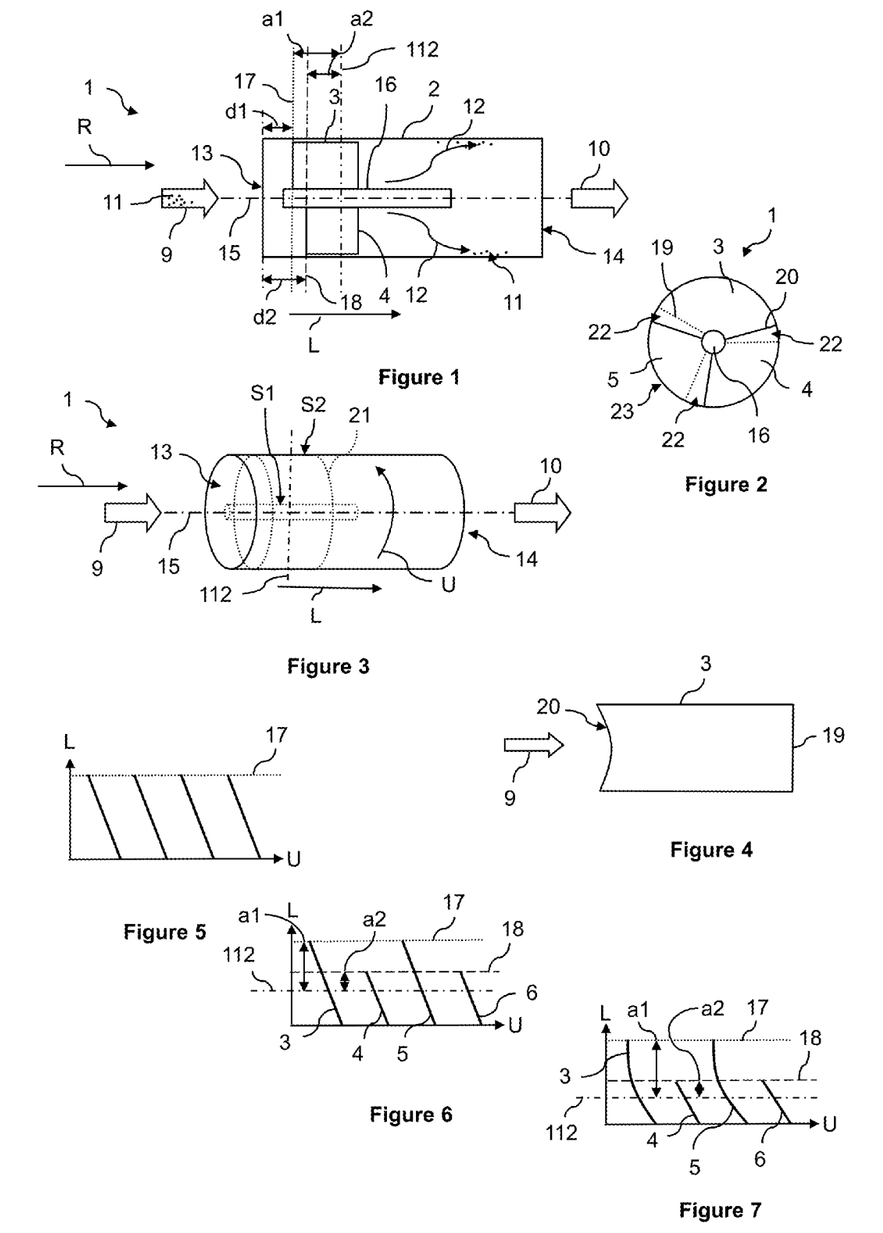
FIG. 1 shows a schematic longitudinal sectional view of an embodiment of a centrifugal-force separator.
FIG. 2 shows a schematic cross-sectional view of the embodiment of a centrifugal-force separator.
FIG. 3 shows a perspective schematic view of the embodiment of a centrifugal-force separator.
FIG. 4 shows a schematic illustration of an embodiment of a guide blade.
FIG. 5 shows a schematic longitudinal profile of a guide blade.
FIG. 6 shows another schematic longitudinal profile of a guide blade.
FIG. 7 shows yet another schematic longitudinal profile of a guide blade.

FIG. 1 shows a schematic longitudinal sectional view of an embodiment of a centrifugal-force separator. FIGS. 2 and 3 show cross-sectional views and perspective views of the embodiment.

In a centrifugal-force or cyclone separator, particles are removed from a fluid laden with particles. This is indicated in FIG. 1 by an arrow representing a raw fluid flow 9. The raw fluid 9, for example air for an internal combustion engine, can contain dust or other particles 11. After passing through a suitable centrifugal-force separator 1, that is configured, for example, as an axial cyclone, purified air or fluid 10 flows out.

The centrifugal-force separator 1 has a substantially cylindrical housing 2. The housing 2 or the centrifugal-force separator 1 has a longitudinal axis 15 which, in the embodiment of FIGS. 1 to 3, corresponds also to a symmetry axis. At the inflow side, an inflow opening 13 is provided, and an outflow opening 14 is provided at the outflow side. In the centrifugal-force separator 1, a swirl is generated in the housing 2 by suitable flow guiding action, as a result of which the particles 11 in the air are subjected to centrifugal forces. This means, the particles 11 are driven radially outwards in the direction toward the cylindrically shaped housing wall 23 (cf. FIG. 2). Thereat, as indicated in FIG. 1, they can accumulate and can be removed.

For generating the swirl-shaped flow and thus radial forces acting on the particles 11, a guide apparatus with suitable guide blades 3, 4 is provided. The guide blades 3, 4 can be wound, for example, in a screw-shaped or propeller-shaped manner about the axis 15 of the centrifugal-force separator 1. This is also referred to as axial cyclone. In the illustration of FIG. 1, an axial core 16 is provided along the longitudinal axis 15 at least in a section in the vicinity of the inflow opening 13. The axial core 16 is secured by the guide blades 3, 4 illustrated in the FIGS. 1 and 2. The guide blades 3, 4 cause the turbulent flow, which is indicated by means of the arrows 12. Particles or fluid guided from the inflow opening 13 to the outflow opening 14 flow(s) along the guide blades 3, 4.

In the perspective illustration of FIG. 3, the sleeve-shaped or tubular housing 2 with the inflow opening 13 and the outflow opening 14 can be seen. The axial core 16, also shown in FIG. 1, and the guide blades 3, 4 form in particular a guide apparatus 21. The guide apparatus 21 can be approximated with a cylindrical shape, which is illustrated in FIG. 3 by dotted lines.

Figure 24:
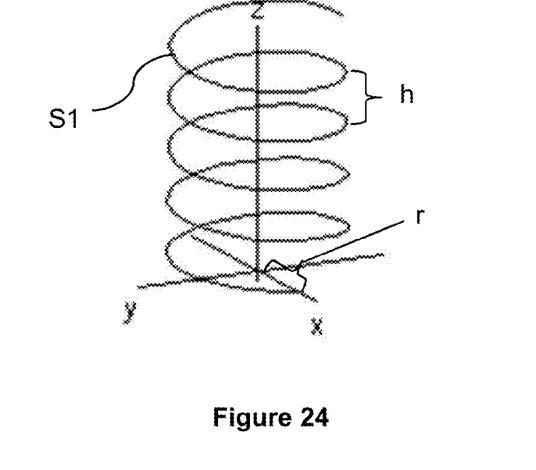
FIG. 24 is a schematically illustrated helical line.

The guide blades 3, 4 extend in this context between an inner spiral line or helical line S1 and an outer helical line S2. In FIG. 24 a helical line S1 is illustrated on the core 16, for example. The helical line can be parameterized in Cartesian coordinates as vector $x(t)=[x(t), y(t), z(t)]=[r \cos(2\pi t), h\, t+c]$. In this context, t is the running parameter and r the radius. The shift c is set for reasons of simplification to zero.

The guide blade apparatus 21 is designed such that the pitch hi of the inner helical line S1 is greater than the pitch ha of the outer helical line S2. Studies of the applicant have shown that a ratio of the pitches relative to each other of hi/ha>1.05 leads to particularly good degrees of separation. Particularly favorable is a ratio of hi/ha>1.1. Even better results are obtained for ratios of hi/ha>1.2. Conceivable are also different pitches with hi/ha>1.3

In FIG. 2, which illustrates a cross-sectional view of the centrifugal-force separator, the axial core 16 at the center and the circular housing wall 23 are shown. In the cross-sectional view of FIG. 2, three guide blades 3, 4, 5 are shown, each having a leading edge or an inflow profile 20 and a trailing edge or an outflow profile 19. In FIG. 2, only the guide blade 3 is provided with reference numbers with regard to its leading edge 20 and trailing edge 19. In embodiments, the guide blades or the guide blade apparatus 21 is configured such that in a cross-section, thus a view in the direction of the housing axis 15, the guide blades do not overlap each other. This means, between a leading edge 20 and a trailing edge 18 of adjacent guide blades, for example, between 3 and 4, 4 and 5, and 5 and 3, a gap 22 is formed. Thus, the entire centrifugal-force separator 1 can be implemented in a simple manner as a monolithic piece. In particular, an injection molding method can be used. However, undercuts, thus circumferential guide blades, are conceivable also in principle.

In FIG. 4, a schematic illustration of a guide blade is indicated. The arrow 9 indicates the inflow direction of raw fluid. The guide blade 3 comprises a leading edge 20 and a trailing edge 19. The strip-shaped guide blade 3 is arranged helically or spirally about a respective axial core 16, as indicated in FIGS. 1 to 3.

A dimension for the length L of the guide blades 3, 4 is indicated in FIG. 1. The length L of a guide blade 3, 4 can be, for example, the distance which a particle travels on a surface of a guide blade from the inflow side to the outflow side. The embodiment in FIG. 1 is provided with guide blades 3, 4 of different lengths. This means, the guide blade 3 begins at a spacing d1 from the inflow opening 13 and extends in the direction toward the outflow opening 14. The second guide blade 4 illustrated in FIG. 1 extends at a distance d2, which is greater than d1, from the inflow opening 13 in the direction toward the outflow opening 14. The dotted line 17 and the dotted line 18 show in cross-section of FIG. 1 the respective leading edge position of the guide blades 3 and 4, respectively, in relation to the inflow opening 13.

In FIGS. 1 and 3, a cross-sectional area 112 is indicated by a dash-dotted line, wherein the cross-sectional area 112 extends perpendicular to the longitudinal axis 15 of the housing 2 and thus is also substantially perpendicular to an inflow direction R of the raw air 9, which is indicated by the arrow R. A corresponding cross-sectional area can be assumed at any position along the housing axis 15 and serves, for example, as a reference plane for the leading edges 20 of the guide blades 3, 4. It can be seen, for example, that the leading edge 20 of the guide blade 3 has a spacing a1 from the cross-sectional plane of the cross-sectional area 112, and the leading edge 20 of the guide blade 4 has a spacing a2<a1. In other words, in the illustrated embodiment of the centrifugal-force separator 1, the leading edges 20 of at least two guide blades 3, 4 have a different spacing a1 and a2, respectively, in relation to a cross-sectional area 112 of the housing 2, which is substantially perpendicular to an inflow direction R of the raw air 9.

Studies of the applicant have shown that by differently arranged leading edges 20 or by guide blades 3, 4 of different lengths, for example, in relation to a spacing from the inflow opening 13, improved separation properties can be achieved in centrifugal-force separators 1.

In order to explain the geometry and configuration of the guide blades 3, 4 in more detail, the respective profile along the circumference U in relation to the length L, thus the extension of the guide blades in the flow direction, can be illustrated.

FIGS. 5 to 8 show schematic length profiles of guide blades. The dashed line 17 shows the position of the guide blade that begins closest to the inflow opening. In FIGS. 5-8, the bold (diagonal or curved) lines indicate guide blades along the circumference and their length or the height of the guide blade apparatus. Furthermore, the plane 112 is illustrated by a dash-dotted line as well as the spacings a1 and a2 relative thereto. FIG. 1 shows four guide blades of equal length for generating swirls in the fluid flow. Improved separation of particles can be achieved in centrifugal-force separators when the guide blades have different lengths or when the leading edges are differently spaced relative to the inflow opening 13 or relative to an illustrated plane 112.

For example, FIG. 6 illustrates a possibility in which the four guide blades 3, 4, 5, 6 have in each case alternately a different length. Again, the dashed line 17 and a dashed line 18 as a cross-sectional line perpendicular to the longitudinal axis are illustrated in each case offset in the direction of the longitudinal axis 15 in the flow direction, and a dash-dotted plane 112 is illustrated. The guide blades have alternately a different length. In relation to the inflow opening 13, the guide blades 3 and 5 begin at the same cross-sectional area 17. The guide blades 4 and 6 located therebetween have a shorter length and begin in the direction of the longitudinal axis 15 offset in the direction of the fluid flow at the cross-sectional area 18. Thus, in each case a long (3, 5) and a short (4, 6) guide blade are alternately provided. The guide blades illustrated in FIGS. 5 and 6 are substantially straight.

Additional improvement of the flow properties can be achieved when the guide blades are curved. This is illustrated in FIG. 7. The guide blades 3 and 5, which are longer than the guide blades 4, 6, have a curved contour along the length L. It is qualitatively shown that the blade angle in relation to a fluid flow direction or the longitudinal axis 15 of the guide blades 3 and 5 is more flat toward the leading edge than toward the trailing edge.

Figure 8:
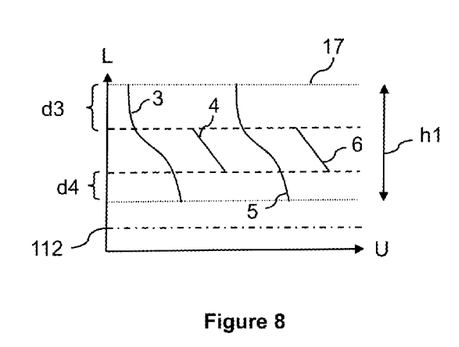
FIG. 8 shows a further schematic longitudinal profile of a guide blade.

FIG. 8 shows another possibility of configuring guide blades differently with regard to their length. Again, an example with four guide blades 3, 4, 5, 8 is indicated. The leading edges of the guide blades 3 and 5 begin at the same cross-sectional area 17. The leading edges of the guide blades 4, 6 therebetween are offset by a spacing d3 in the direction of the flow. Furthermore, the trailing edges of the guide blades 3 and 5, and 4 and 6, respectively, are offset by a spacing d4. Thus, in each case two small guide blades 4, 6 are arranged between long guide blades 3, 5. Overall, this can be referred to as height H1 of the resulting guide blade apparatus together with the core. Furthermore, FIG. 8 shows that the guide blades 3 and 5 are curved, whereas the guide blades 4 and 6 have a substantially straight shape. Particularly the different configurations of the guide blades relative to each other results in a particularly good particle separation or flow guiding action within the housing of a centrifugal-force separator.

Figure 9:
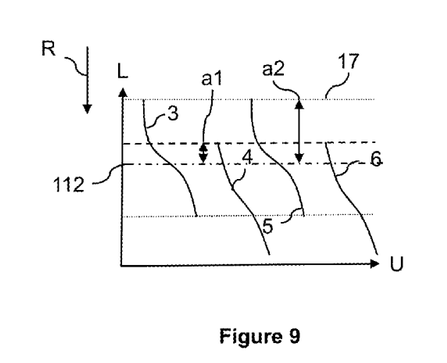
FIG. 9 shows another schematic longitudinal profile of a guide blade.

In FIG. 9, a centrifugal-force separator version is illustrated in which the guide blades 3, 4, 5, 6 have the same length, but the leading edges have alternately different spacings a1, a2 with regard to the cross-sectional area 112. For example, in the orientation of FIG. 9, the inflow direction R extends from top to bottom.

Figure 10:
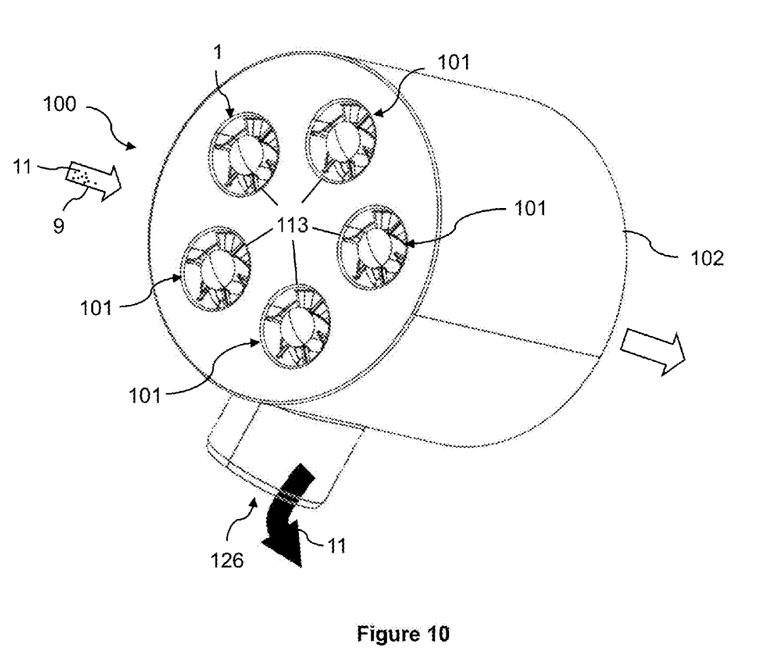
FIG. 10 shows a perspective view of an embodiment of a filter device with centrifugal-force separators.
Figure 11:
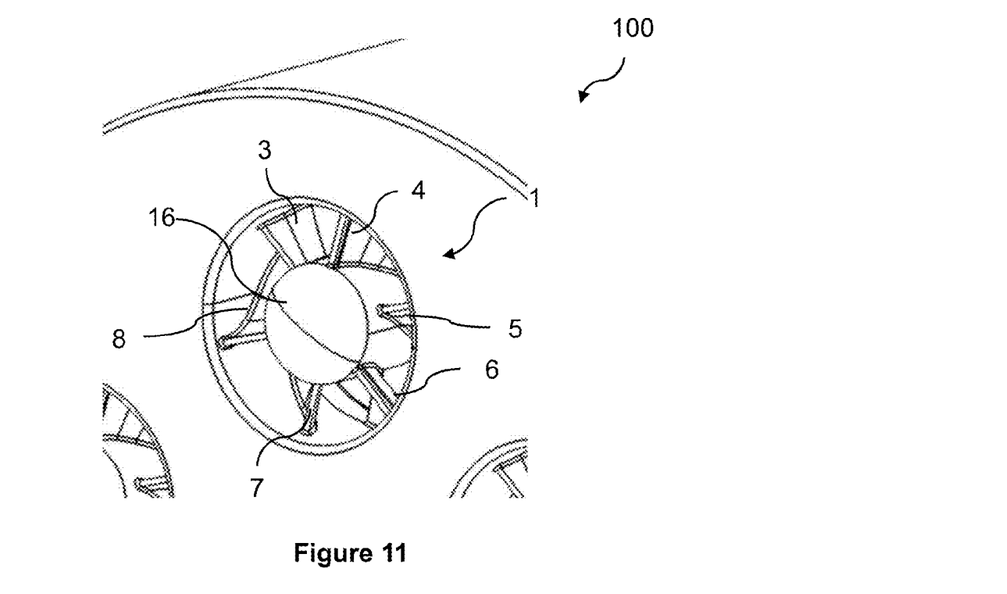
FIG. 11 shows a detail view of a detail of the embodiment of a filter device with centrifugal-force separators.
Figure 12:
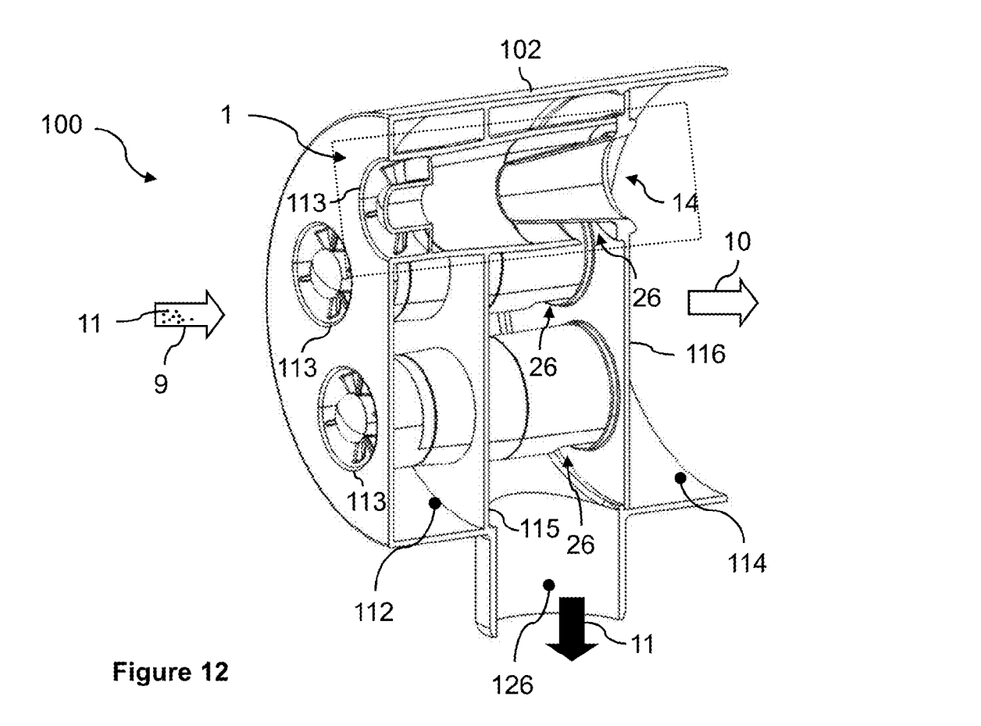
FIG. 12 shows a sectional view of the embodiment of a filter device with centrifugal-force separators.

A plurality of centrifugal-force separators according to the above-described embodiments can be combined in a common housing so as to form a filter device. In FIGS. 10 to 12, embodiments of a filter device with centrifugal-force separators are illustrated. FIG. 10 shows a perspective view of an embodiment, FIG. 11 shows a detail view of a centrifugal-force separator inserted therein, and FIG. 12 shows a cross-sectional view of an embodiment of a filter device.

A filter device 100 comprises in this context a filter device housing 102 in which a plurality of centrifugal-force separators 1, 101 are integrated. In the orientation of FIGS. 10 and 12, the inflow of particle-laden raw fluid 9 takes place from the left. Purified fluid 10 flows out to the right. Separated particles can be removed in the downward direction, as indicated by the black arrow 11. The filter device housing 102 is provided with a plurality of filter device housing openings 113 in which inflow openings 13 of the centrifugal-force separators 1, 101 are fitted. A particle discharge opening 126 discharges in the downward direction from the filter device housing 102. It is apparent from the detail view of FIG. 11 that the inserted centrifugal-force separators 1 comprise a central axial core 16 and are provided with six guide blades 3, 4, 5, 6, 7, 8. It can be seen in the detail view of FIG. 11 that the guide blades 5, 7 and 3 are shorter than the guide blades 4, 6 and 8.

In the cross-sectional view of FIG. 12, a centrifugal-force separator 1 (dotted rectangular region) is indicated in cross-section. In the following FIG. 13, a detailed illustration of the corresponding sectional view of an embodiment of a centrifugal-force separator is shown. The filter device 100 has substantially three regions. A holding region 112 carries or holds the regions of the guide blade apparatus of the centrifugal-force separators 1, 101. The outflow openings 14 of the centrifugal-force separators 1, 101 lead into a common outflow section 114. The outflow section 114 is separated from a discharge section 126. The centrifugal-force separators 1, 101 are provided with particle discharge windows 26 that are communicatively connected to the discharge section 126. On the inflow side, polluted, for example, combustion air enters the centrifugal-force separator 1, 101 through the filter device housing openings 113, flows through the centrifugal-force separators which discharge the particles at the particle discharge windows 26, and purified air exits through the outflow openings 14 into the outflow section 114. The purified air 10 can now be fed to an internal combustion engine, for example. In relation to the gravitational acceleration, which is directed downwards in the orientation of FIG. 12, the orientation of the discharge windows 26 is the same. Thus, the particles fall downward through the discharge section 126 due to gravity and can be transported away. The parallel arrangement of centrifugal-force separators enables adjustment of the resulting pressure losses and degrees of separation.

A corresponding filter device 100 achieves an even better filtering effect when the pressure at the discharge section 126 is lower with respect to the pressure at the inflow openings 113. For example, the discharge section that is configured as a suction nozzle can be connected to a suction device that collects and removes the dust.

Figure 13:
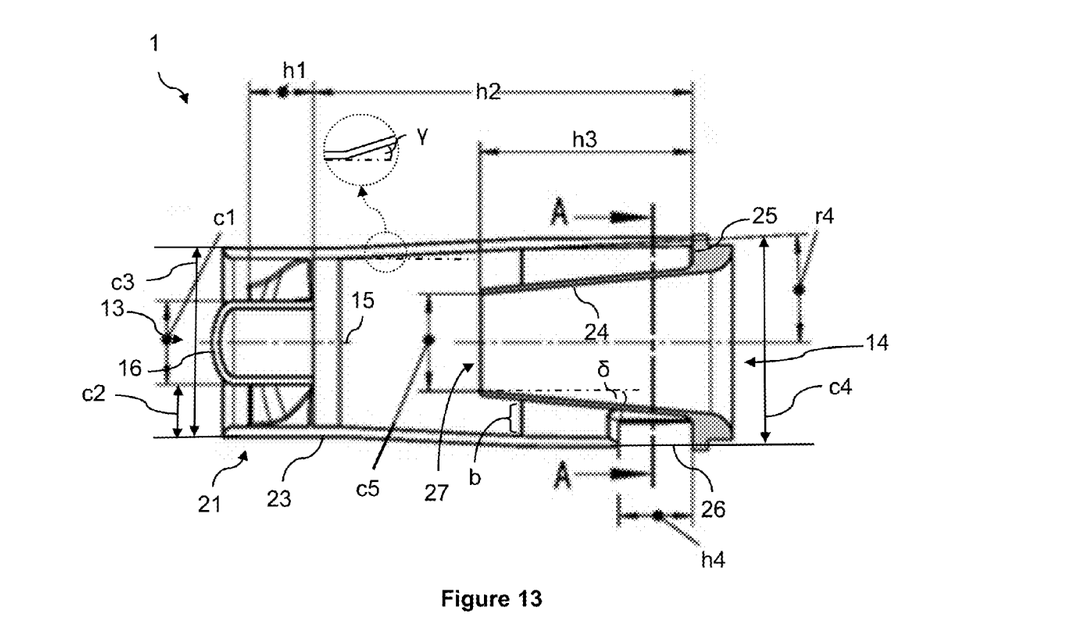
FIG. 13 shows a longitudinal sectional view of a second embodiment of a centrifugal-force separator with exemplary dimensions.
Figure 14:
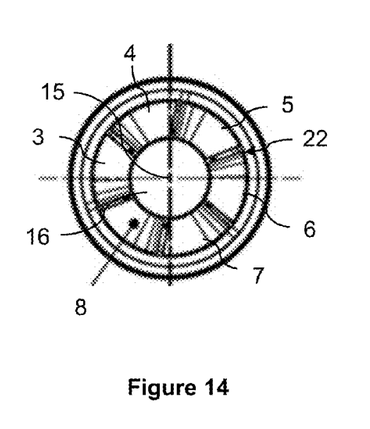
FIG. 14 shows a cross-sectional view of the second embodiment of a centrifugal-force separator with exemplary dimensions.
Figure 15:
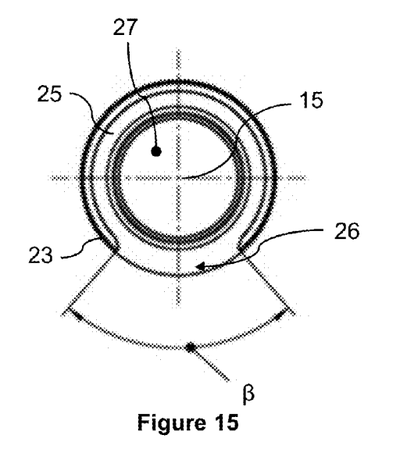
FIG. 15 shows a cross-sectional view of the second embodiment of a centrifugal-force separator with exemplary dimensions.

FIGS. 13, 14, and 15 show a second embodiment of a centrifugal-force separator in a longitudinal section and cross-section. Furthermore, exemplary dimensions are shown in the Figures. The longitudinal section of FIG. 13 shows the centrifugal-force separator 1 with a housing made of a housing wall 23 which has in certain sections cylindrical sections and conical sections. At the inflow side (left), an inflow opening diameter c3 is indicated. At the outflow side (right), an outflow opening diameter c4 is shown. Along the flow direction, oriented left to right in FIG. 13, the diameter of the housing increases. Thus, a cross-sectional area increases from the inflow opening toward the outflow opening.

FIG. 13 shows additionally an outflow opening radius r4, wherein r4=0.5 c4. A guide apparatus 21 is provided in the region of the inflow opening 13. The guide apparatus 21 has a height h1. The height h1 of the guide apparatus 21 is to be understood in relation to the longitudinal axis 14 as a section in which the guide blades extend around the axial core 16. The axial core 16 has a core diameter c1. The width of the guide blades c2 is to be understood as the spacing between the axial core 16 and the housing wall 23. Thus, this results in a guide blade width c2=0.5 c3−c1.

From the outflow opening 14, a conical immersion tube 24 extends into the interior of the housing 23. The immersion tube 24 is fastened by means of an immersion tube plate 25 that is coupled to the outflow opening 14 of the housing 23. The immersion tube 24 extends with an immersion depth h3 from the outflow opening 14 or the immersion tube plate 25 in the direction toward the guide apparatus 21. The immersion tube 24 has a conical shape. Furthermore, this region of the housing or the housing wall 23 has a conical geometry. In FIG. 13, the angles γ and δ are indicated. The angle γ indicates the angle of the housing wall 23 relative to the longitudinal axis 15. The angle δ shows the angle that is defined by the immersion tube 24 and the longitudinal axis. Angles between 2° and 6° for γ or δ have proven to be advantageous. Due to the conical arrangement of the housing section and also of the immersion tube plate, an advantageous flow guiding action is possible.

Furthermore, the housing wall 23 has a particle discharge window 26 in its end region. The particle discharge window 26 extends with a discharge window depth h4 along the longitudinal axis 15. In FIG. 15, a section along the line A-A is indicated. The particle discharge window 26 defines an angular range β relative to the longitudinal axis 16. Thus, the particle discharge window opens an angular section β in the housing wall 23. FIG. 14 shows a cross-sectional view through the guide apparatus 21. Similar to FIG. 2, six guide blades 3-8 are shown, wherein there is a gap 22 between each of the guide blades in the cross-sectional view of FIG. 14. Thus, the guide blades do not overlap.

FIG. 13 furthermore shows a gap width b, thus a spacing between the immersion tube 24 and the housing wall 23 at a predetermined cross-section perpendicular to the longitudinal axis 15. The smallest diameter of the immersion tube is designated by c5. Thus, the immersion tube 24 shifts the outlet opening by the immersion depth h3 in the direction toward the interior of the housing 23. It has been found that a discharge window depth between 10 and 20 mm and an opening angle between 70° and 90° are advantageous. An immersion depth h3 of the immersion tube 24 ranges advantageously between 30 and 50 mm. In this context, an immersion tube diameter c5 can be selected to be between 16 and 20 mm. A spacing between the immersion tube plate 25 and the guide apparatus 21 is designated by h2 and ranges preferably between 60 and 80 mm. A core diameter c1 is preferably selected to be between 12 and 18 mm. The angle γ of the conical section of the housing wall 23 is preferably less than 4° so as to avoid flow separation.

Figure 16:
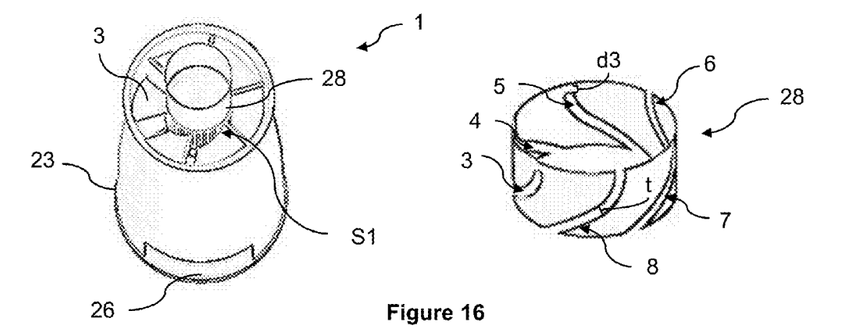
FIG. 16 shows a perspective illustration of an embodiment of a centrifugal-force separator and a sectional view of an embodiment of a guide apparatus.
Figure 17:
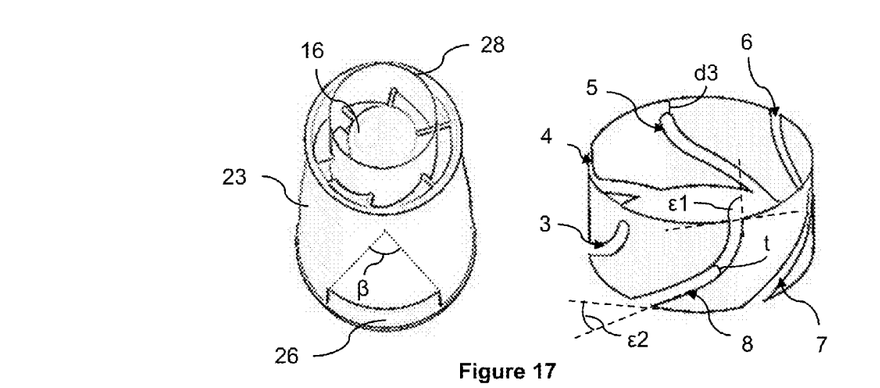
FIG. 17 shows a perspective illustration of an embodiment of a centrifugal-force separator and a sectional view of an embodiment of a guide apparatus.
Figure 18:
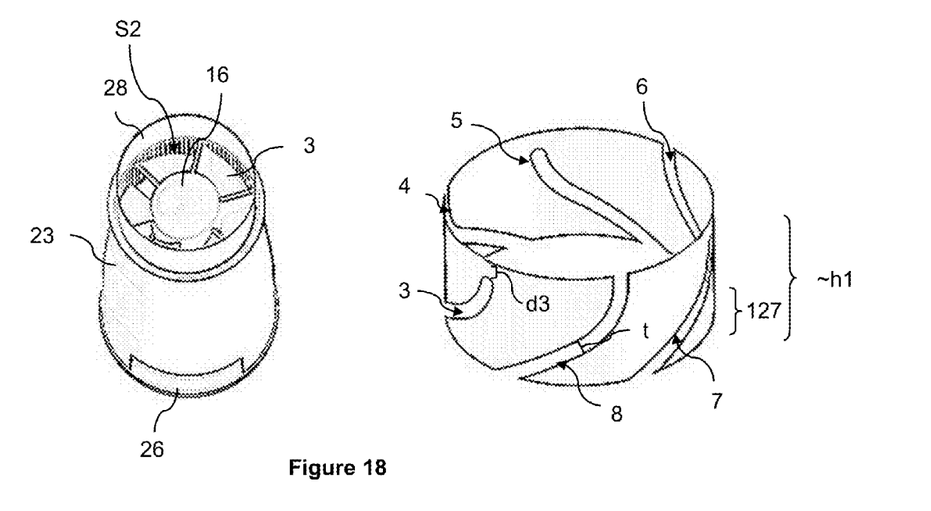
FIG. 18 shows a perspective illustration of an embodiment of a centrifugal-force separator and a sectional view of an embodiment of a guide apparatus.

Degrees of separation and pressure losses can be set advantageously, also by the geometry and shape of the guide blades. In FIGS. 16 to 18, perspective illustrations of centrifugal-force separators and sectional views of the guide apparatus are shown. Here, a perspective view of an embodiment of a centrifugal-force separator 1 is illustrated in each case on the left. The centrifugal-force separator has a housing wall 23, which in certain sections has conical sections or sleeve-shaped sections. For example, the centrifugal-force separator can be configured as illustrated in the cross-sectional view of FIG. 13. A particle discharge window 26 is illustrated in each case, and an exemplary guide blade 3 is designated by the reference number. Moreover, the axial core 16 can be seen. The perspective illustrations in FIGS. 16 to 17 show a view from above onto the guide apparatus or into the inflow opening of the centrifugal-force separator 1. The illustration to the right shows the partially developed helical line S1 on the core 28.

In FIG. 17, the opening angle β for the particle discharge opening 26 is indicated by dotted lines. In FIGS. 16 to 18, in each case on the right side, the sectional areas 28 with the guide blade geometries, indicated on the left side, are shown. FIG. 16 shows a section around the core similar to a cylinder jacket 28 at the axial core 16. In FIG. 17, a section 28 is taken approximately midways between the housing wall 23 and the axial core 16, and in FIG. 18 a section 28 is taken at the inner side of the housing wall 23 where the guide blades are.

On the right side of FIGS. 16-17, the guide blades 3, 4, 5, 6, 7 and 8 are shown. Thus, exactly six guide blades are provided. Here, the guide blades 4, 6 and 8 are longer than the guide blades 3, 5 and 7. The guide blades 3, 5 and 7 are shorter by the spacing d3.

Moreover, angles of attack ϵ1, ϵ2 are indicated in particular in FIG. 17. In the notation of FIGS. 16 to 18, an angle of attack ϵ, relative to a cross-sectional area, is perpendicular to the symmetry axis of the centrifugal-force separator 1. The sum of an angle of attack ϵ relative to a cross-section and of the blade angle α relative to the longitudinal axis adds up to 90 degrees. The angle of attack ϵ1 in the embodiment as illustrated in FIG. 17 is greater than the angle of attack ϵ2, for example. In the orientation of the Figure, the angle ϵ1 is at the inflow side and the angle ϵ2 is at the outflow side. Furthermore, a thickness t of the guide blades is indicated in each case. Moreover, the height h1 of the guide apparatus is illustrated in FIG. 18. The guide blades 3 define at the housing wall 23 an outer helical line S2. In this context, the pitch of the helical line S1 is greater than the pitch of the helical line S2. A spread results.

With regard to the separation properties of the centrifugal-force separator 1, optimization can be done by spreading the blade angles. For example, the respective angle of attack ϵ at the core (cf. FIG. 16) can be greater than the angle of attack in the region of the housing wall (cf. FIG. 18). This can result in a spread of the angle of attack of, for example, 30°. In FIG. 17, a mean angle of attack of approximately 45° is indicated. Thus, the angle of attack or also the blade angle changes from the core toward the housing wall of a respective guide blade. Mean angles of about 45° have proved to be advantageous blade angles or angles of attack.

Figure 19:
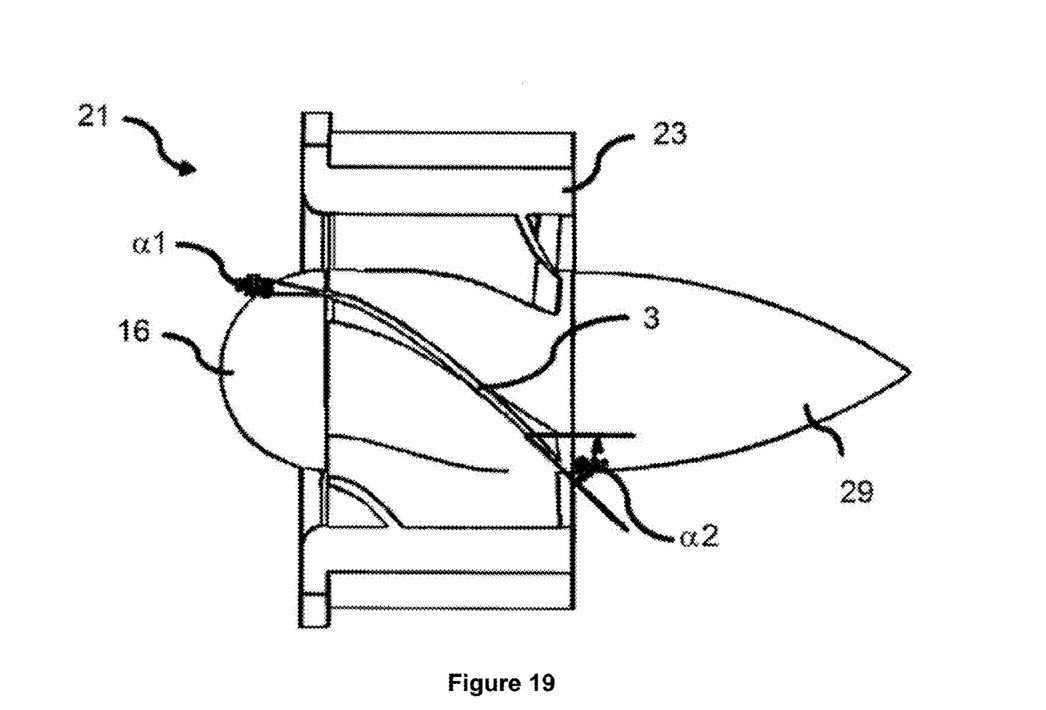
FIG. 19 shows a side view of a further embodiment of a guide apparatus.

FIG. 19 illustrates a side view of another embodiment of a guide apparatus. Here, the axial core 16 has an approximately round dome at the inflow side and, at the outflow side, it has a trailing hub 29 that extends beyond the guide apparatus. The profile of the core can also be adjusted further. The trailing hub 29 influences swirling or flow separation in an advantageous manner. Furthermore, an exemplary guide blade 3 is shown in FIG. 18. The blade angle of the guide blade 3 changes along the fluid flow. Here, the blade angle α1 is the angle of the guide blade relative to the longitudinal or symmetry axis of the centrifugal-force separator. At the inflow side, the angle α1 is, for example, approximately 10° and increases in the direction toward the outflow side to a blade angle a2 through approximately 50°.

An increasing blade angle results in a better swirling action and therefore in stronger centrifugal forces acting on the particles. Thus, the degree of separation is influenced in an advantageous manner. Furthermore, the profile of the guide blade 3 can be adjusted with regard to its thickness. FIG. 18 also illustrates that in an outflow region 127 the angle $\epsilon 2$ is identical at the interior and the exterior. This means that the pitches hi and ha in the outflow region are identical so that there are no strong spreads of the guide blades.

Figure 20:
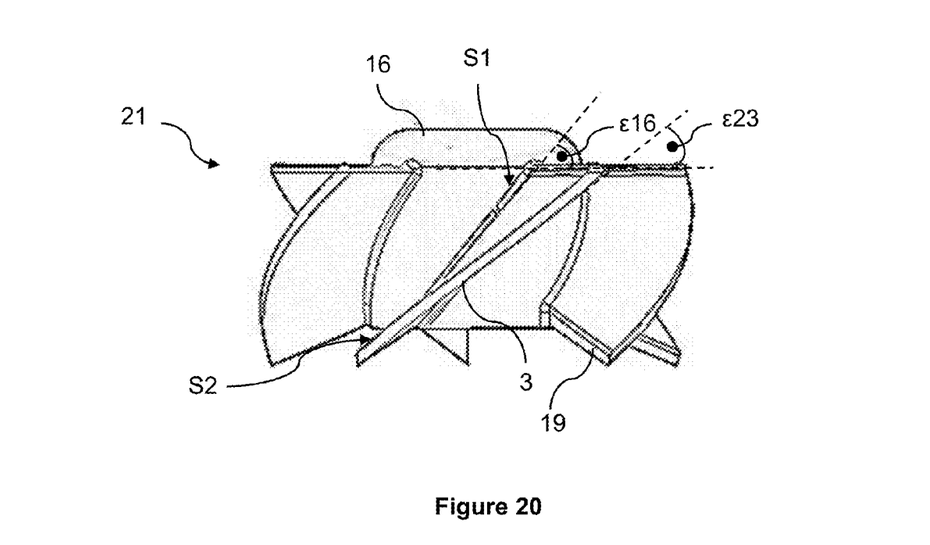
FIG. 20 shows a side view of a further embodiment of a guide apparatus.

Finally, FIG. 20 shows an example of an embodiment of a guide apparatus 21. In the orientation of FIG. 20, the inflow side is on top and the outflow side is at the bottom. The example of the guide blade 3 in the middle shows that the angle of attack $\epsilon 16$ at the core is greater than the angle of attack $\epsilon 23$ at the housing wall. Furthermore, it can be seen that the guide blades 3 have an inclined trailing edge 19. In the state inserted in a housing, the respective guide blade 3 has a greater length at the housing than at the core. This is also called a progressive blade end, which can result in a further improvement of the separation properties of a centrifugal-force separator. With the aid of the guide blade 3 at the middle, one can see the helical lines S1 and S2 between which the guide blade 3 extends.

As shown in FIG. 20, the trailing edge 19 of the guide blade 3 may have a radially inner portion of the trailing edge 19 nearest the core 16 angularly displaced from the radially outer portion of the trailing edge 19 nearest the housing. The angular displacement between the radially inner and radially outer portions of the trailing edge 19 is identified in FIG. 20 as angle A1. As shown in FIG. 20, the angle A1 is relative to the longitudinal axis 15 (see FIG. 1) along which the core 17 extends. As shown in FIG. 20, the angular sweep of the guide blade 3 between the guide blade leading edge 17, 18 and the guide blade trailing edge 19 nearest the core 16 may have an angle A2 while the guide blade trailing edge 19 portion nearest the housing 16 may have an angle A3. As illustrated in FIG. 3, the guide blade 3 may sweep a larger angle A3 near the housing than the angle A2 near the core.

Figure 21:
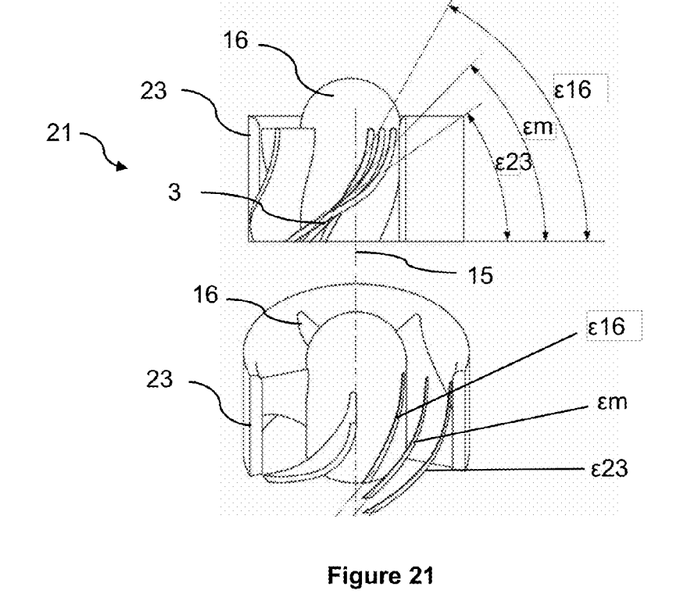
FIG. 21 shows a perspective view and a sectional view of a guide apparatus for illustrating angular spreads.

FIG. 21 illustrates by means of a combination of a sectional view and a perspective view of another guide apparatus the possible angle situations. The illustration is similar to the guide apparatus shown in FIGS. 16-18. A guide apparatus 21 is illustrated that has a axial core 16 and a housing wall 23 as well as guide blades provided therebetween, wherein a guide blade 3 and its profile are looked at in more detail. FIG. 21 also shows the longitudinal axis 15 of the guide apparatus.

The angle of attack at the axial core 16 is $\epsilon 16$, and the angle of attack at the housing 23 is $\epsilon 23$. The blades are in particular constructed in the shape of a spiral staircase where different angles of attack and/or blade angles exist at the core and at the jacket or the housing wall. The difference between $\epsilon 16$ and $\epsilon 23$ is also referred to as angle spread $\Delta\epsilon$.

Furthermore, a mean angle of attack $\epsilon m$ can be defined, which extends approximately midways between the core wall and the inner wall of the housing. A suitable definition for the mean angle of attack is: $\epsilon m = (\epsilon 23 + \epsilon 16)/2$.

Figure 22:
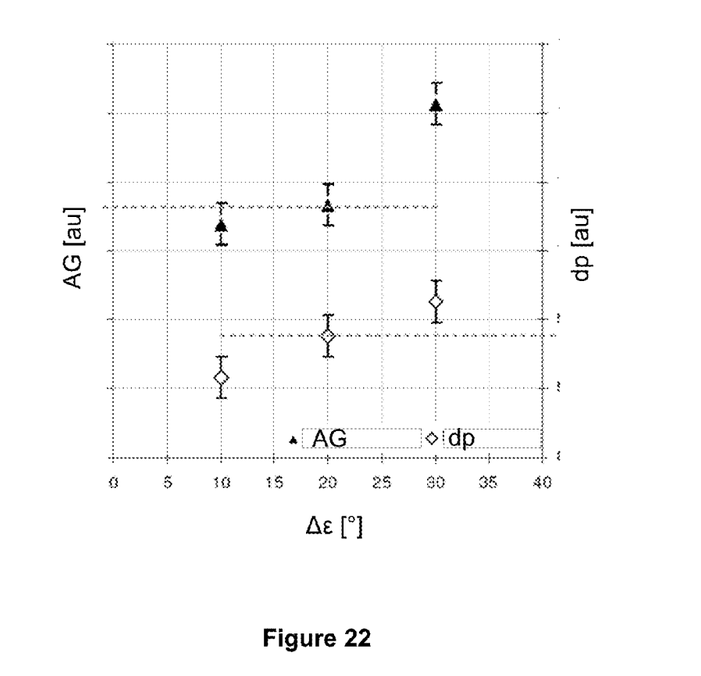
FIG. 22 shows a degree of separation and pressure loss as a function of an angular spread in embodiments of the centrifugal-force separator.

Possible angles of attack range between $\epsilon 16 \approx 80°$ and $\epsilon 23 \approx 20°$. The angle spread $\Delta\epsilon$, which results from the inner and outer angles of attack, has a particular influence on the performance data of a corresponding guide apparatus. FIG. 22 shows the degree of separation AG and the pressure loss dp in each case in arbitrary units as a function of the angle spread $\Delta\epsilon$. It can be seen that by implementing the angle spread $\Delta\epsilon$, the degree of separation AG increases; however, at the same time, pressure loss increases. Studies of the applicant have shown that an angle spread between 15° and 35° involves acceptable pressure losses and results in a good filtering effect. Particularly good filtering results are obtained at an angle spread between 20° and 30°.

Figure 23:
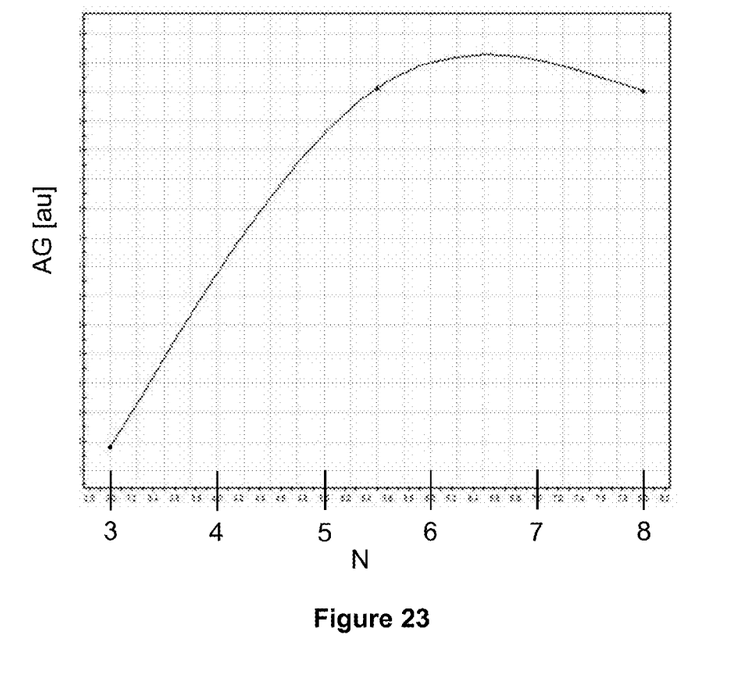
FIG. 23 shows a degree of separation as a function of a number of blades in another embodiment of the centrifugal-force separator.

Furthermore, the applicant performed studies in regard to the dependency of the efficiency of centrifugal-force separators on the number of blades used in the guide apparatus. FIG. 23 shows a diagram for the degree of separation AG as a function of a number N of blades for another embodiment of the centrifugal-force separator. The degree of separation AG is indicated in arbitrary units. The curve corresponds to an embodiment in which the core diameter corresponds to approximately 15.5 mm and the blade angle $\epsilon \approx 45°$. It can be seen that in this configuration, a maximum degree of separation is obtained for a number of blades between N=6 and N=7. Thus, centrifugal-force separators with six guide blades are preferred in particular. Together with, for example, alternately shortened guide blades and/or an angle spread of the angles of attack or blade angles, particularly efficient centrifugal-force separators with advantageous degrees of separation and pressure losses for fluid to be cleaned flowing through are obtained. The indicated measures with regard to shortened blades, angle spread, shape of the discharge window and/or geometry of the immersion tube interact in a potentially synergistic manner and result in filter devices that can be manufactured in a simple manner and that have a good filtering efficiency.

Even though the present invention has been described based on various examples and aspects of centrifugal-force separators, it is not limited thereto but can be modified in various ways. In particular, the various aspects discussed in the Figures and the exemplary embodiments can be combined with each other. It is not absolutely necessary to provide guide blades of different lengths. Simply adjusting the angles of attack, blade angles, lengths, widths, or ratios between core diameter and housing diameter can result in improvements of cyclone separators. Furthermore, the mentioned values, numbers of guide blades are to be understood as examples only. For examples, values between 2 and 10 can be used for the guide blades. The materials of the centrifugal-force separators can be adapted to the respective fields of use. In particular, plastics suitable for injection molding are conceivable.

While specific embodiments of the invention have been shown and described in detail to illustrate the inventive principles, it will be understood that the invention may be embodied otherwise without departing from such principles.

What is claimed is:

1. A centrifugal-force separator for separating particles from a fluid, the centrifugal-force separator comprising:
 a housing having an inflow opening and an outflow opening;
 an axial core and a plurality of guide blades connected to the axial core, wherein the axial core and the guide blades are disposed in the housing;
 the guide blades configured to generate a turbulent flow of a fluid flowing in through the inflow opening into the housing in an inflow direction;
 the guide blades extending radially between a first helical line at the axial core and a second helical line at a housing wall of the housing;
 wherein a first pitch of the first helical line is greater than a second pitch of the second helical line;
 wherein the first pitch is greater by at least 5% than the second pitch.

2. The centrifugal-force separator according to claim 1, wherein the guide blades each have a leading edge and a trailing edge,
wherein at least one of the leading edge and the trailing edge is located in a cross-sectional area of the housing that is substantially perpendicular to the inflow direction of the fluid.

3. The centrifugal-force separator according to claim 2, wherein
the axial core extends along a longitudinal axis;
wherein the trailing edge of a guide blade of the plurality of guide blades has a radially inner portion of the trailing edge nearest the axial core and a radially outer portion nearest the housing wall;
wherein the radially inner portion of the trailing edge nearest the axial core is angularly displaced about the longitudinal axis in an angular position different from the radially outer portion of the trailing edge nearest the housing wall, relative to the longitudinal axis;
wherein the guide blade has a first sweep angle defined between the guide blade leading edge and radially inner portion of the trailing edge nearest the axial core;
wherein the guide blade has a second sweep angle defined between the guide blade leading edge and radially outer portion of the trailing edge nearest the housing wall;
wherein the first sweep angle is different from the second sweep angle.

4. The centrifugal-force separator according to claim 3, wherein the first sweep angle is smaller than the second sweep angle.

5. The centrifugal-force separator according to claim 1, wherein
a leading edge of a first one of the guide blades has a first spacing relative to a cross-sectional area of the housing that is substantially perpendicular to the inflow direction of the fluid and a leading edge of a second one of the guide blades has a second spacing relative to said cross-sectional area of the housing,
wherein said first spacing and said second spacing are different from each other.

6. The centrifugal-force separator according to claim 1, wherein
at least two of the guide blades have a different length relative to each other.

7. The centrifugal-force separator according to claim 1, wherein
at an inflow side of the housing a first one of the guide blades has a first spacing from the inflow opening in the inflow direction and a second one of the guide blades has a second spacing from the inflow opening in the inflow direction,
wherein the first and the second spacings are different from each other.

8. The centrifugal-force separator according to claim 1, wherein
at least a portion of the housing from the inflow opening and the outflow opening is sleeve-shaped or tubular,
wherein the guide blades and the axial core form a cylindrical guide blade apparatus that is inserted in the housing.

9. The centrifugal-force separator according to claim 1, wherein
the guide blades are stationary.

10. The centrifugal-force separator according to claim 1, wherein
a thickness of at least one of the guide blades changes in a direction from the axial core toward the housing wall.

11. The centrifugal-force separator according to claim 1, wherein
a thickness of at least one of the guide blades changes along a length of said at least one guide blade.

12. The centrifugal-force separator according to claim 1, wherein
an inflow profile of at least one of the guide blades is curved.

13. The centrifugal-force separator according to claim 1, wherein the plurality of guide blades is exactly six guide blades.

14. The centrifugal-force separator according to claim 1, wherein
the axial core defines a housing axis;
wherein, when the plurality of guide blades in the housing are viewed along the housing axis from the inflow opening or from the outflow opening, a gap is visible between a leading edge of a first guide blade and the trailing edge of an adjacent second guide blade such that first and second guide blades do not overlap each other.

15. The centrifugal-force separator according to claim 1, wherein
the axial core is longer in an axial direction of the housing than the guide blades.

16. The centrifugal-force separator according to claim 1, wherein
a ratio of a core diameter of the axial core and a spacing that is measured between the housing wall and the axial core is between 2 and 4.

17. The centrifugal-force separator according to claim 1, wherein
a cross-sectional area of the housing increases in a flow direction of the fluid through the housing.

18. The centrifugal-force separator according to claim 1, further comprising
an immersion tube disposed in the housing, wherein the immersion tube tapers cross-sectionally from the outflow opening in a direction toward the inflow opening.

19. The centrifugal-force separator according to claim 18, further comprising
an immersion tube plate, wherein the immersion tube is secured at the outflow opening by the immersion tube plate.

20. The centrifugal-force separator according to claim 1, further comprising
a particle discharge opening in the housing wall, wherein the particle discharge opening, relative to a longitudinal axis of the housing, opens a predetermined angular section in the housing wall.

21. A filter device comprising:
a filter device housing comprising a plurality of filter device housing openings;
a plurality of centrifugal-force separators, each according to claim 1 disposed in the filter device housing, wherein the plurality of centrifugal-force separators are disposed within respective ones of the plurality of filter device housing openings;
the filter device housing comprising an outflow section separated fluid-tightly from the filter device housing openings;
wherein the outflow openings of the centrifugal-force separators are coupled to the outflow section.

22. The filter device according to claim 21, comprising
a discharge section that is separated fluid-tightly from the filter device housing openings and from the outflow section, wherein the plurality of centrifugal-force separators each have a particle discharge window, wherein the discharge section communicates with the particle discharge windows of the centrifugal-force separators.

* * * * *